United States Patent [19]

Baus, Jr. et al.

[11] Patent Number: 5,091,807
[45] Date of Patent: Feb. 25, 1992

[54] RECORDER SYSTEM WITH DEMAND ACTUATION

[75] Inventors: Rene Baus, Jr., Rancho Palos Verdes; Kenneth C. Petty, Huntington Beach, both of Calif.

[73] Assignee: American Magnetics Corporation, Carson, Calif.

[21] Appl. No.: 356,775

[22] Filed: May 24, 1989

[51] Int. Cl.$^5$ .................. G11B 15/18; H04M 1/64
[52] U.S. Cl. .............................. 360/71; 379/083
[58] Field of Search .............. 360/7, 8, 52, 32, 71; 379/83

[56] References Cited

U.S. PATENT DOCUMENTS

| 4,649,441 | 3/1987 | Louth | 360/73.08 |
| 4,894,728 | 1/1990 | Goodman | 360/52 |

Primary Examiner—Aristotelis M. Psitos
Assistant Examiner—Won Tae C. Kim
Attorney, Agent, or Firm—Herbert M. Shapiro

[57] ABSTRACT

A video cassette rotary scanner is adapted for high capacity, high speed, digital audio spectrum data recording by the use of a buffer memory and a servo control system. The buffer memory is operative at a speed much higher than that of the tape. The tape is maintained at relaxed tension until a high data occupancy signal from the buffer activates the data write operation. In response, the tape tension is increased for a write operation, and relaxed again only when the buffer sends a low data occupancy signal. The use of the buffer along with capstan, take-up reel and supply reel motors responsive to the two signals permits tape wear to be decreased substantially while increasing tape capacity.

7 Claims, 4 Drawing Sheets

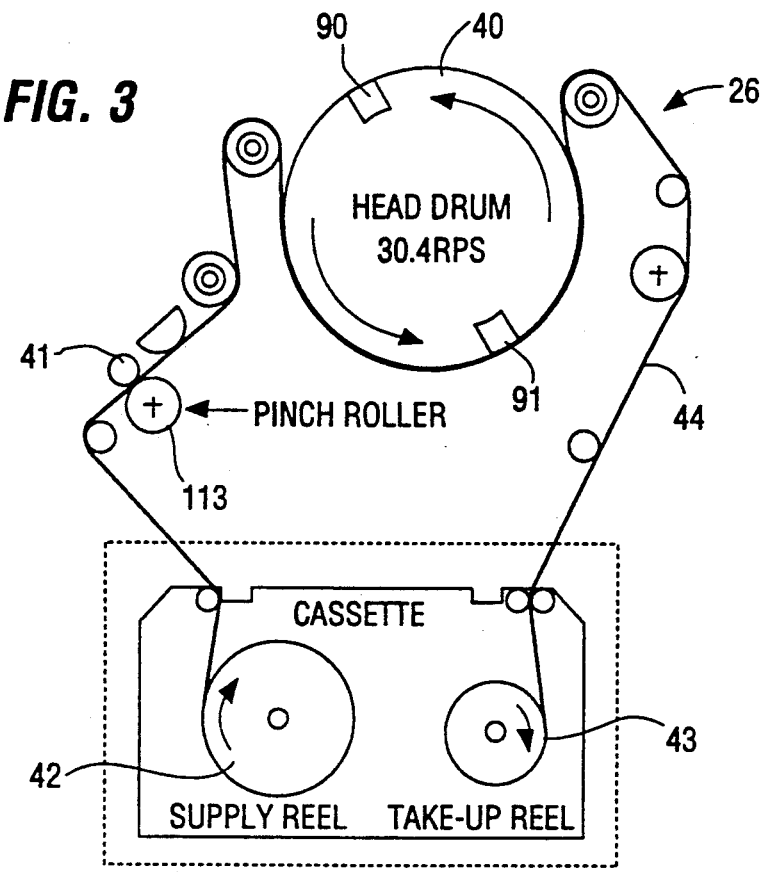
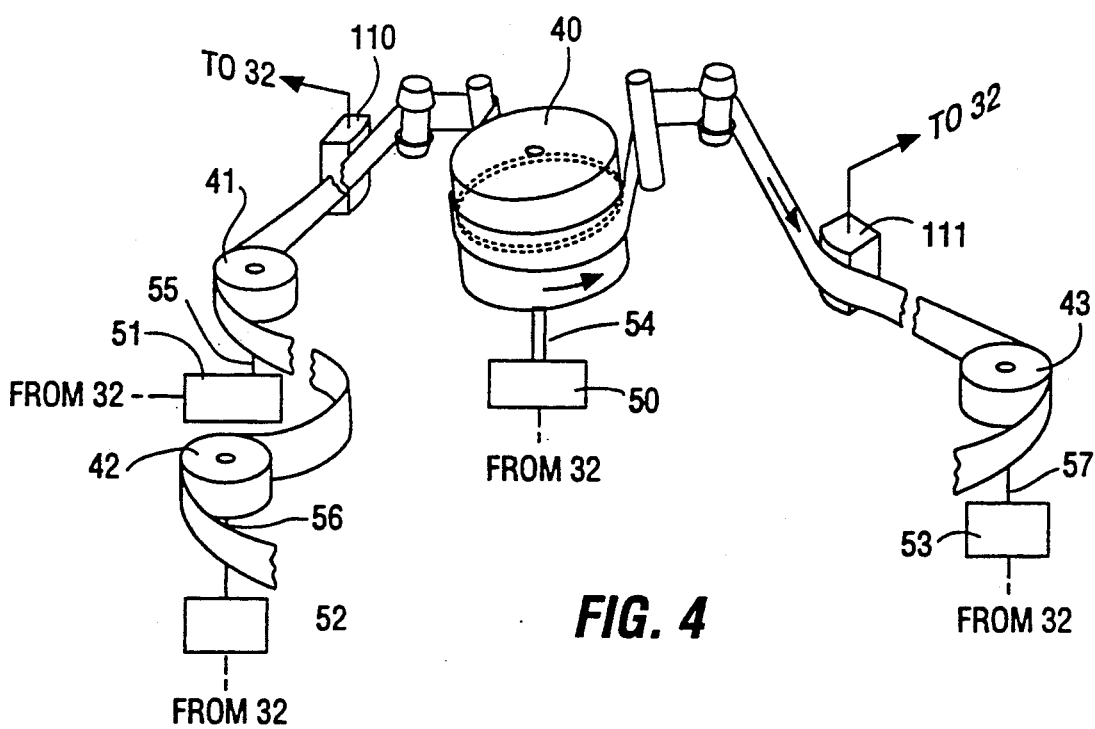

| STATUS | TAPE TENSION |
|---|---|
| CARTRIDGE POSITIONED | RELAXED |
| READ/WRITE | CAPSTAN AND SUPPLY REEL ACTIVATED TO TAKE-UP SCANNER ASSEMBLY LOOP SLACK. TAKE-UP REEL ACTIVATED TO "HOLD" ITS RELATIVE POSITION AS TENSION REFERENCE. |
| SEARCH | SUPPLY AND TAKE-UP REELS ADJUST AND CONTROL TAPE TENSION WITHOUT CAPSTAN CONTROL INTERVENTION. SELECTED FILE MARKERS ACTIVATE CONTROL TO TRANSITION FROM SEARCH MODE TO READ MODE AND REINSTATE CAPSTAN CONTROL OF THE TAPE TENSION. |
| REWIND/ FAST FORWARD | SUPPLY AND TAKE-UP REELS ADJUST AND CONTROL TAPE TENSION WITHOUT CAPSTAN CONTROL INTERVENTION. END OF TAPE (EOT) SIGNAL TO CIRCUIT 32 TO ACTIVATE MOTORS. |

*FIG. 6*

RECORDER SYSTEM WITH DEMAND ACTUATION

FIELD OF THE INVENTION

This invention relates to a system for recording digital data and, more particularly, to such a system operative to record data on demand such as is required for monitoring or logging applications.

BACKGROUND OF THE INVENTION

The most familiar data recording system used in logging applications is the telephone message recorder. In such a system, a voice activated relay responds to a message signal to activate a motor which moves a tape of a magnetic tape cartridge in a familiar manner. A control circuit is operative to provide play, rewind and other discretionary features as is also familiar with such machines. The control circuit is operative to disengage the voice actuated relay to prevent recording while any of the play, rewind, or any other feature is operative.

Another familiar data logging system is one which is used in computer installations. In this application, open reels of magnetic tape are used rather than cartridges. Reels of this type, although large and capable of storing large amounts of information, require significant amounts of handling and are not as simple and carefree as cartridge systems.

The trade-off, which exists at present, is to use a simple, low cost, low storage capacity cartridge or a labor intensive, high cost open reel system. The constraints imposed on such a system by the application for which the system is designed are worth considering to determine just how a decision is made as to what type of system is to be used.

Consider a high end data monitoring or logging system such as might be used for military applications. Such a system operates under quite strict requirements. A first requirement is that if any data input occurs, it must be collected as it occurs. That is, it must be collected in real time. Another requirement of the system is that no data be lost if the recorder is on line and in a quiescent state when the flow of data commences. A corollary of this latter requirement is that the recorder system operates at a data rate significantly higher than that of the source data rate. Such requirements are not met by available prior art recording systems of the type described above.

BRIEF DESCRIPTION OF AN ILLUSTRATIVE EMBODIMENT OF THIS INVENTION

In accordance with the principles of this invention, familiar video cassette recorder technology is adapted for data monitoring or logging applications. The system includes a video rotary head drive assembly configured for a commercial Super-VHS video cassette. An assembly of this type permits increasingly high data rates and capacity to be achieved. The system also includes a buffer memory to store incoming data temporarily and a servo control system which is operative to vary tape tension during various operations of the system.

The tape drive servo system includes four motors, one for each of the inlet capstan the tape supply reel, the tape take-up reel, and the rotary scanner. The system is operative to control the first three motors with respect to the constant speed scanner motor in a manner to allow the system to respond as required to incoming data, to relieve tension on the tape when operation permits, and to read recorded data without moving the tape. The system is adapted to record digital data and can be configured to be application specific as to the number of data channels it serves as well as to the individual analog channel bandwidth.

BRIEF DESCRIPTION OF THE DRAWING

FIGS. 3 and 4 are schematic representations of portions of the system of FIG. 2.

FIG. 6 is a flow diagram of the tape tension control of the system of FIG. 2.

DETAILED DESCRIPTION OF AN ILLUSTRATIVE EMBODIMENT OF THIS INVENTION

Figure 1:
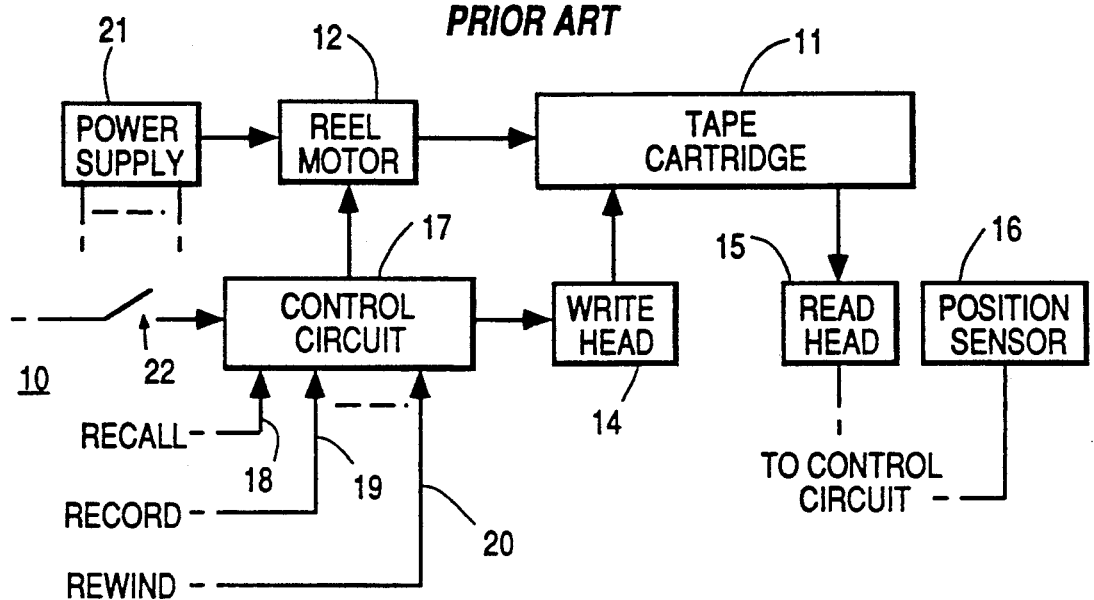
FIG. 1 is a block diagram of a prior art telephone message recorder.

FIG. 1 shows a block diagram of a prior art telephone message recorder 10. The system includes tape cartridge 11 and a reel motor 12 for driving the reels of the cartridge in a write or rewind direction.

Write and read heads 14 and 15, respectively, are coupled to the tape in a familiar manner for record and for message retrieval (read) operations, respectively. A position sensor 16 is provided for a last message recall operation. The various operations for the recorder are controlled by control circuit 17 responsive to operator commands introduced by the depression of keys on the system console as indicated by broken arrows 18, 19, and 20.

The system is powered by power supply 21 which is typically plugged into a house socket. Operation is initiated by an incoming telephone message by means of a voice responsive switch 2 which is disabled when one of the non-record modes of operation is selected by an operator.

Figure 2:
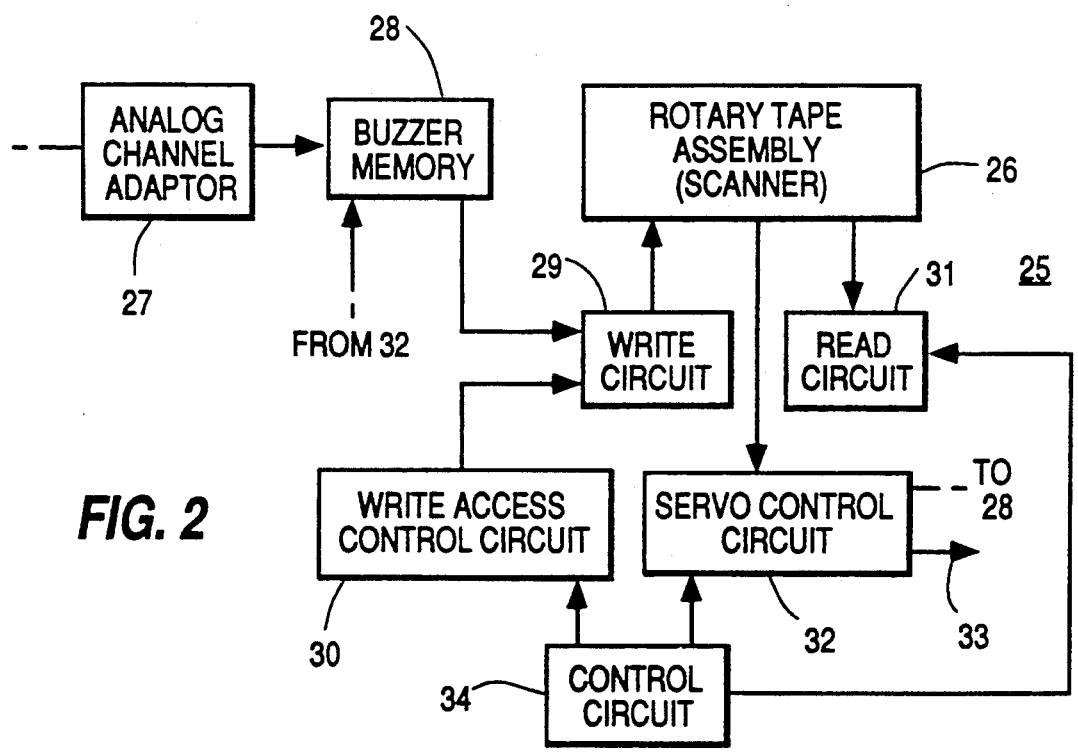
FIGS. 2 and 5 are block diagrams of portions of a data recording system in accordance with the principles of this invention.

FIG. 2 shows block diagram of data recording system 25 in accordance with the principles of this invention. The system includes a rotary scanner tape assembly 26 and an analog channel adaptor 27. The adaptor is operative to accept incoming analog data and convert that data to a digital form acceptable to the recording medium of assembly 26.

The output of adaptor 27 is connected to the input to a buffer memory 28. Memory 28 is a serial memory serving to store incoming data. The output of memory 28 is connected to the input of a write circuit 29. The output of circuit 29 is connected to the input to assembly 26 and is adapted to apply to the tape of assembly 26 the data applied to its input from memory 28. This write application is under the control of a write access control circuit represented by block 30.

The system also includes a read circuit 31. The read head of assembly 26 is connected to the input to read circuit 31. Importantly, outputs from a servo control circuit 32, represented by arrow 33, are connected to three motors which are part of assembly 26. Servo control circuit 32 is operative to control the tension of the tape of assembly 26 and, in concert with buffer memory 28 ensures that the system is available to record incoming data whenever a demand occurs. The entire operation is under the control of control circuit 34 which, in practice, comprises a microprocessor which also could perform the functions of control circuit 30 and 32 as well.

FIGS. 3 and 4 depict the mechanical organization of the rotary tape assembly 26 of FIG. 2. The figures also show the tape path for the assembly and the position of the servo motors under the control of servo control circuit 32. The essential features of the assembly are the rotary drum 40, the capstan, and the supply and take-up reel 42 and 43, respectively. The magnetic tape is designated 44 in FIG. 3 and is threaded along a path determined by a plurality of guides which are shown, but not designated, and are operative to constrain the tape supplied by reel 42 along a prescribed path via capstan 41 to drum 40 and ultimately to take-up reel 43.

In accordance with the principles of this invention, capstan 41, supply reel 42, and take-up reel 43 are driven by dedicated motors under the control of control circuit 32 of FIG. 2. The arrangement is shown in FIG. 4. Specifically, FIG. 4 shows a plurality of motors 50, 51, 52, and 53 connected to drive shafts 54, 55, 56 and 57 about which drum 40, capstan 41, supply reel 42, and take-up reel 43 rotate, respectively. The coordinated activation of motors 51, 52, and 53 under the control of servo control circuit 32 determines the tension on the tape during various segments of the operation. The functions of the various motors in the servo system herein are described in connection with a block diagram of FIG. 5 and the flow diagram of FIG. 6

Figure 5:
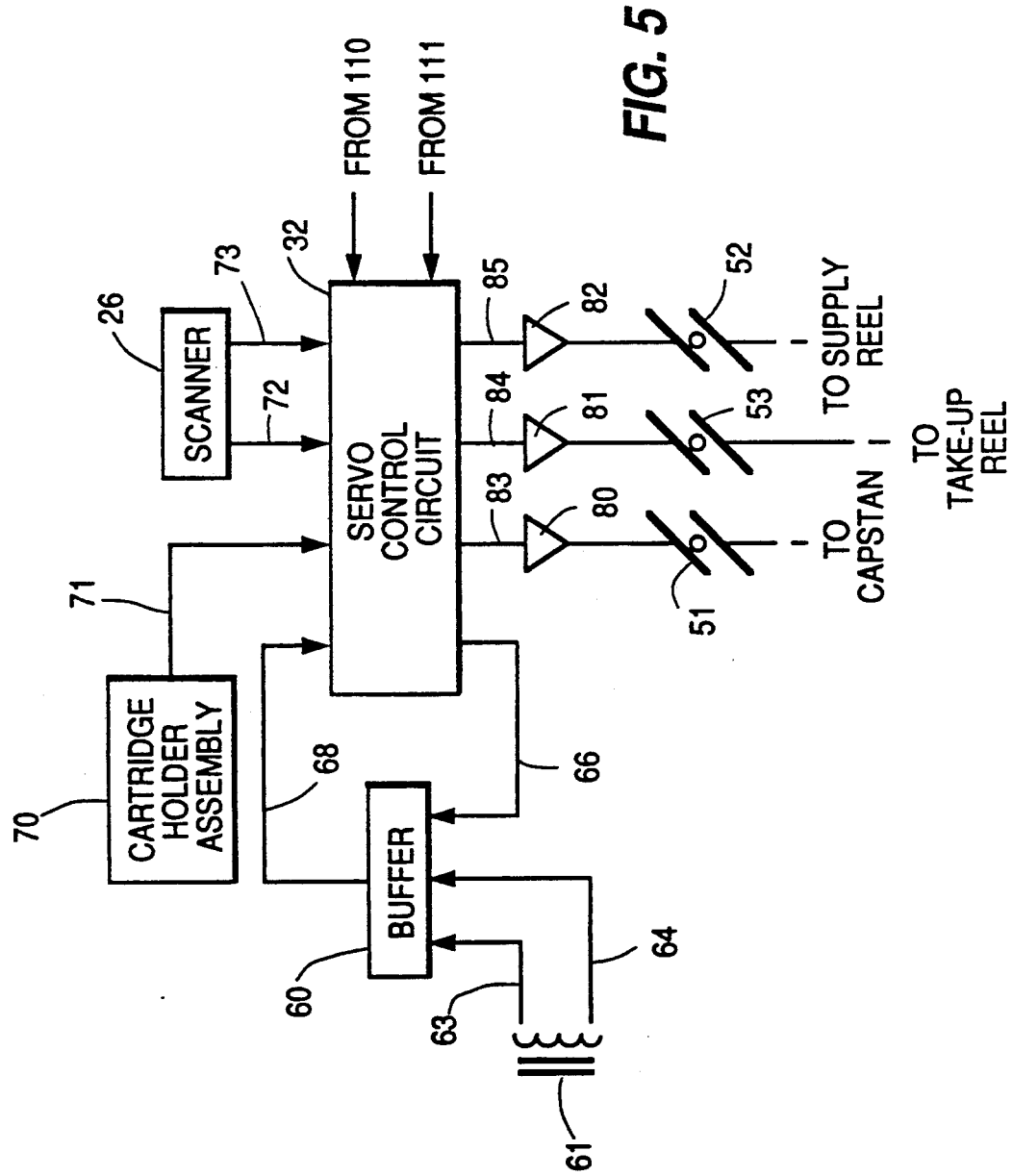

FIG. 5 represents the buffer memory 28 for the system as a block designated 60. Outputs from the scanner (see 26 of Figure 2) read head 61 are connected to first and second inputs to the buffer memory by lines 63 and 64 for short and long read operations respectively. An output from the servo control circuit 32 is also connected to an input to buffer 60 by line 66. An output from the buffer is connected to an input to servo control circuit 32 by line 68. An output from the cartridge holder assembly 70 is connected to an input to servo control circuit 32 by line 71. Outputs from scanner 26 are connected to inputs to the servo control circuit as indicated by lines 72 and 73.

Outputs from the servo control circuit are connected to inputs to amplifiers 80, 81, and 82 by lines 83, 84 and 85, respectively. Outputs of the amplifiers are connected to motors 51, 53 and 52, respectively. The motors 51, 52 and 53 drive the capstan 41, the supply reel 52, and the take-up reel 53 as is clear from FIG. 4.

The rotary scanner (motor 50) is activated by a signal on line 71 that a cartridge is in place. In response, scanner 26 (drum 40) is activated and rotates at a constant speed. The operation is exactly as occurs in presently available commercial video cassette recorders.

The scanner assembly includes write and read heads 90 and 91, shown in FIG. 3. These heads are stationary. The drum also includes a signal generator operative to provide timing signals as is the case in presently available cassette recorders. These elements are unchanged in the present system.

In the present system, those timing signals are applied to servo control circuit 32 by line 72. The scanner signals circuit 32 that the cartridge tape is properly threaded and in a relaxed state—the normal condition for the tape. The servo system is operative to control the tape tension during the various operations of the scanner. The system operates by controlling motors 51, 52 and 53 with respect to the timing signals from scanner 26.

The servo system is operative as follows: Operation commences when the cartridge is positioned and the tape is threaded and in a relaxed tension state. The system is now in a standby condition and available to receive data.

In accordance with the principles of this invention, all incoming data is stored in buffer memory 60. Buffer memory 60 accepts synchronous or nonsynchronous data and stores the data for subsequent recording to tape. The memory operates at a speed significantly higher than that of the tape, thus providing an opportunity for the tape tension to be relaxed at times when the buffer has significantly unused capacity.

When that unused capacity reduces to a preset amount of 15%, for example, the memory sends a signal via line 68 to the servo control circuit. The servo control circuit responds to bring the tape to its write/read tension by activating motor 51 to back up the capstan to increase the tension and to activate motor 52 to permit the supply reel to take up slack. The amount of tape backspaced is that amount which resides in the scanner assembly loop of commercially available scanners.

There are several function control sensors operative to register the tape with the capstan. One such sensor is located at the capstan and designated 110 in FIG. 4. Another such sensor 1 11 (in FIG. 4) provides a feedback signal for controlling the tension outside the scanner assembly loop by controlling the reeling motors. The sensor outputs are connected to inputs to circuit 32 as shown in FIGS. 4 and 5.

FIG. 3 shows a pinch roller 113 cooperating with capstan 41. The pinch roller is actuated so as to maintain the tape in contact with the capstan during write (or read) tape motion. When sufficient data has been written from buffer 60 to tape 44, the buffer provides a "low occupancy" signal at a predetermined minimum level. In response, control circuit 32 deactivates the capstan motor and the reeling motors to relax the tape tension.

The scanner is always rotating at a constant speed. Accordingly, write and read heads 90 and 91 of FIG. 3 are moving with respect to tape 44. The tape is read by the read head and the stored data is validated while the tape is stationary. After validation, the tape is advanced to the next track.

The read operation is similar to the write operation to the extent that the tape is normally relaxed and the tension is increased only during the read operation. The sensors 110 and 111 provide feedback signals for controlling the tension. The capstan control is operative to advance or retard the tape-to-scanner position to adjust the read track to a position coincident with the read head as is the case with commercially available video cassette recorders. Each written track includes servo reference data for this adjustment.

The search, rewind and fast forward functions are carried out without capstan involvement. During search, only longitudinal file marks are being read out. When the requested file mark is located, the mechanism is directed into the read mode as described above. For either the fast forward or rewind operation, the scanner moves to the corresponding end of the tape where an appropriate signal end of tape (EOT) or beginning of tape (BOT) signal is provided. The device then waits for further instructions and the tape remains relaxed. FIG. 6 shows a chart of the various functions of the scanner herein and the associated tape tension:

The use of a buffer memory and the tension control arrangement avoids the constant advance of tape even when no incoming data is present. The provision for a relaxed normal state for the tape reduces tape wear. As a result, a recorder system in accordance with the principle of this invention is characterize by increased media utilization and by improved tape wear.

What is claimed is:

1. Apparatus comprising a rotary scanner having read and write heads and a tape drive mechanism with the means for positioning a tape cassette so that the tape of said cassette engages said scanner and is maintained normally in a relaxed state of tension in a tape assembly loop, said apparatus comprising a buffer memory and an audio signal channel adaptor means, means responsive to data in said channel adaptor means for writing said data into said buffer, high and low data occupancy signal means for providing first and second signals when data occupies a first high amount of the capacity of said buffer and a second low amount of said capacity respectively, said apparatus also including a servo arrangement comprising a capstan, a supply reel, and a take-up reel having first, second and third motors respectively and a control means connected to said high and low data occupancy signal means for activating said motors responsive to said first and second signals for increasing the tension on said tape from said relaxed state to an operative state of tension and from operative state to said relaxed state respectively.

2. Apparatus in accordance with claim 1 also including first and second sensor means for providing third and fourth signals representative of said operative state of tension in said tape assembly loop and external to said tape assembly loop respectively.

3. Apparatus in accordance with claim 2 also including means responsive to said third and fourth signals for deactivating said first, second and third motors.

4. Apparatus in accordance with claim 3 also including motor drive means for rotating said scanner, said motor drive means being activated responsive to a "cartridge in place" signal, and means responsive to the proper positioning of a cartridge for generating said "cartridge-in-place" signal.

5. Apparatus in accordance with claim 4 also including means coupled to said scanner for generating a timing signal for each complete rotation of said scanner, and means for synchronizing the operation of said first, second and third motors with said timing pulses.

6. Apparatus in accordance with claim 5 also including selection means for generating a read signal, said control means being operative for activating said motors for increasing tension on said tape.

7. Apparatus in accordance with claim 6 also including means for selecting tape search and rewind operations.

* * * * *